(12) United States Patent
Degner et al.

(10) Patent No.: US 8,091,178 B2
(45) Date of Patent: Jan. 10, 2012

(54) HINGE

(75) Inventors: Brett William Degner, Menlo Park, CA (US); Patrick Kessler, San Francisco, CA (US); Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 12/081,521

(22) Filed: Apr. 17, 2008

(65) Prior Publication Data

US 2009/0260187 A1  Oct. 22, 2009

(51) Int. Cl.
*E05F 1/14* (2006.01)
(52) U.S. Cl. ............... 16/285; 16/304; 16/307; 16/373; 16/374
(58) Field of Classification Search ............... 16/277, 16/285, 295, 304, 307, 373, 374
See application file for complete search history.

(56) References Cited

U.S. PATENT DOCUMENTS

| | | | | |
|---|---|---|---|---|
| 4,043,001 A * | 8/1977 | Parsons | | 16/222 |
| 5,197,841 A * | 3/1993 | Tanaka | | 411/522 |
| 6,748,625 B2 * | 6/2004 | Lu | | 16/285 |
| 2003/0172495 A1 * | 9/2003 | Pan | | 16/292 |
| 2004/0064919 A1 * | 4/2004 | Lu | | 16/285 |
| 2004/0088825 A1 * | 5/2004 | Lu | | 16/285 |

* cited by examiner

*Primary Examiner* — Victor Batson
*Assistant Examiner* — Emily Morgan
(74) *Attorney, Agent, or Firm* — Beyer Law Group LLP (57) ABSTRACT

A hinge has a pintle, a moving leaf, a resilient device and a stationary leaf. The pintle has a resilient device mount formed on a distal end and is mounted securely in the stationary leaf. The moving leaf is mounted rotatably around the pintle and has a barrel having a protruding limit formed on an outer end. Because the resilient device mount is formed on the pintle, it does not break easily and may slip to prevent terminal failure and be reset when closed. The protruding limit abuts the stationary leaf and ensures a gap is formed between the leaves for wires cabling or the like. Therefore the hinge has improved wear and longer lifespan.

20 Claims, 10 Drawing Sheets

HINGE

BACKGROUND OF THE INVENTION

1. Field of the Invention

The present invention relates to a hinge, especially to a hinge for notebooks with improved lifespan.

2. Description of the Prior Arts

Notebook computers are small and light so are an increasingly popular addition for business people, sales persons and students.

Figure 9:
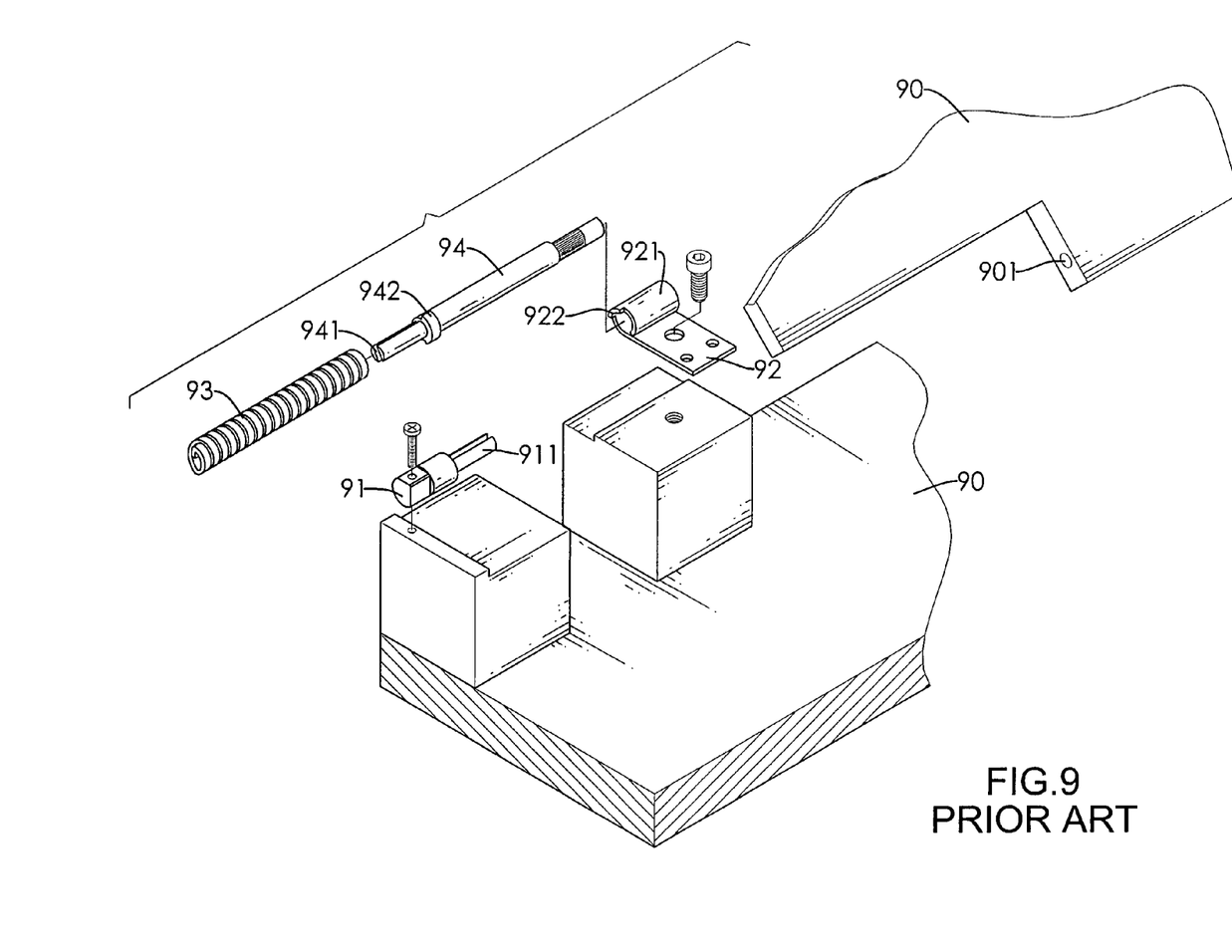
FIG. 9 is an operational perspective view, showing a conventional hinge in accordance with the prior art.

With reference to FIG. 9, the notebook (90) comprises a base and a cover having a pintle mount (901) and being mounted pivotally on the base using a conventional hinge. A conventional hinge has a resilient device mount (91), a stationary leaf (92), a resilient device (93) and a pintle (94). The resilient device mount (91) has a proximal end and a distal end. The proximal end is mounted securely on the base. The distal end is smaller than the proximal end is substantially cylindrical and has a slot (911) formed longitudinally in the distal end of the support rod (91). The stationary leaf (92) is mounted on the base and has a barrel (921). The pintle (94) has a distal end, a proximal and a slot (941) being formed longitudinally in the distal end of the pintle (94). The proximal end of the pintle (94) is mounted in the pintle mount (901) of the cover (90) and through the barrel (921) of the stationary leaf (92). The resilient device (93) is mounted around the distal ends of the support rod (91) and the pintle (94) and protrudes respectively securely in the slots (911, 941) of the resilient device mount (91) and the pintle (94). However, when the hinge is rotated, a torsional force builds up in the resilient device (93) and this can break the resilient device mount (91) after a long time use.

Figure 10:
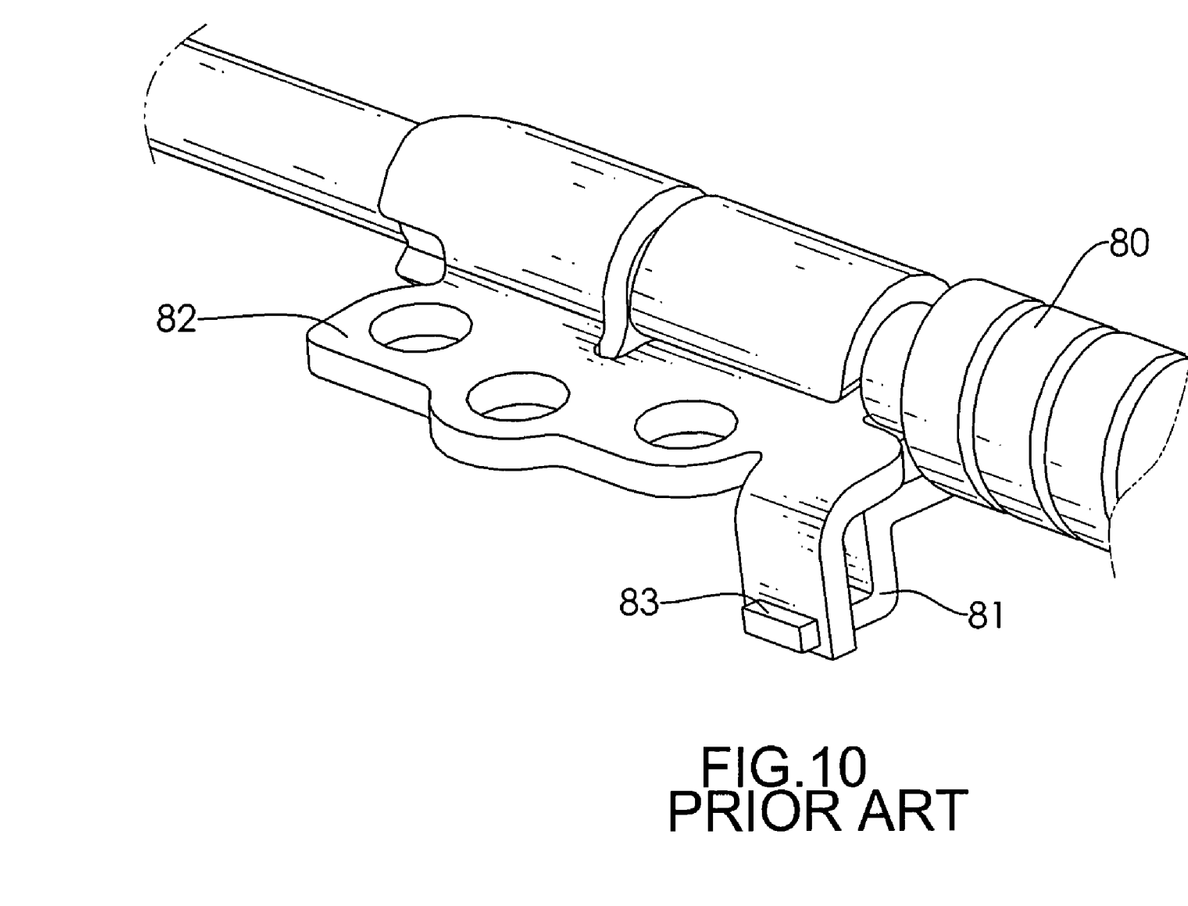
FIG. 10 is an enlarged operational exploded perspective view, showing another conventional hinge in accordance with the prior art.

With reference to FIG. 10, another conventional hinge comprises a resilient device (80) and a moving leaf (82). The moving leaf (82) has a mounting hole (83). The resilient device (80) has an end (81) being mounted in the mounting hole (83) of the moving leaf (82). However, the end (81) of the resilient device (80) needs to be bent 90 degrees to be mounted in the mounting hole (83), so the end (81) of the resilient device (80) is easily broken when the resilient device (80) is under tension.

To overcome the shortcomings, the present invention provides a hinge to mitigate or obviate the aforementioned problems.

SUMMARY OF THE INVENTION

The main objective of the present invention is to provide a hinge that with improved lifespan.

The hinge in accordance with the present invention has a pintle moving leaf, a resilient device and a stationary leaf.

The pintle comprises a resilient device mount formed on a distal end and is mounted securely in the stationary leaf. The moving leaf is mounted rotatably around the pintle and comprises a barrel having a protruding limit formed on an outer end.

Because the resilient device mount is formed on the pintle, it does not break easily and may slip to prevent terminal failure and be reset when closed. The protruding limit abuts the stationary leaf and ensures a gap is formed between the leaves for wires cabling or the like. Therefore the hinge has improved wear and longer lifespan.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
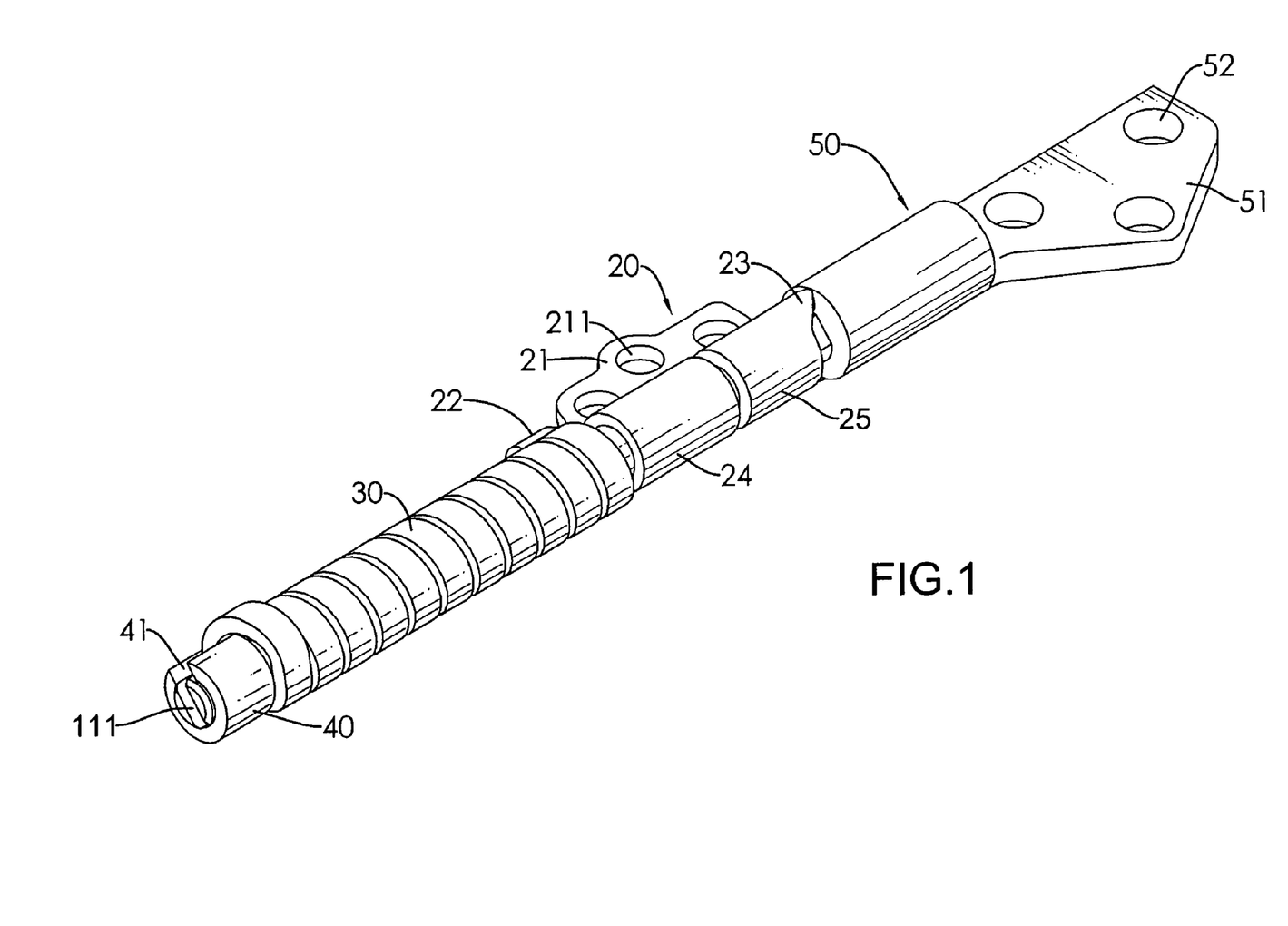
FIG. 1 is a perspective view of a hinge in accordance with the present invention.
Figure 2:
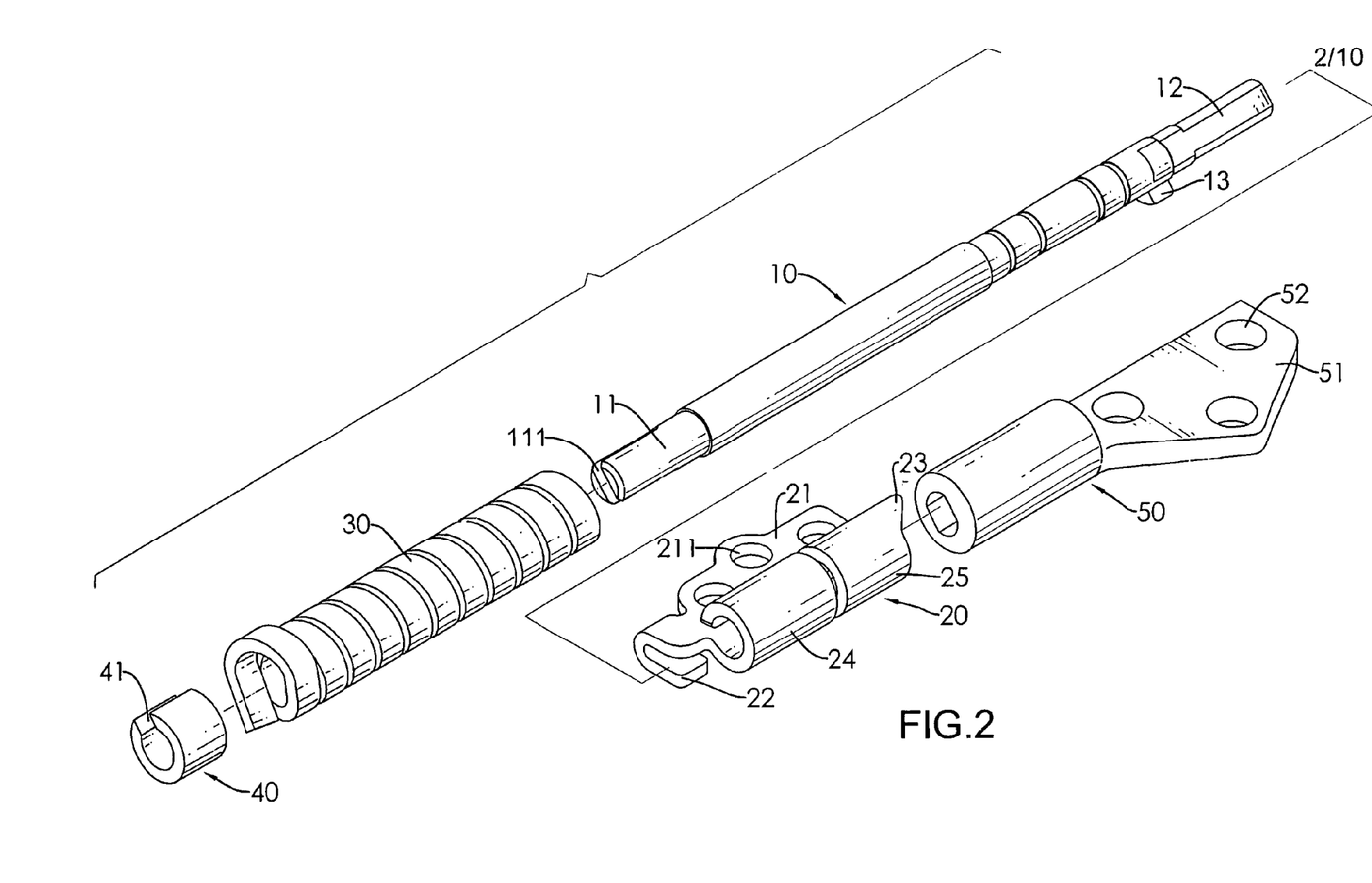
FIG. 2 is an exploded perspective view of the hinge in FIG. 1.

With reference to FIGS. 1 and 2, a hinge in accordance with the present invention has a pintle (10), a moving leaf (20), a resilient device (30), an optional C-clip (40) and a stationary leaf (50).

Figure 3:
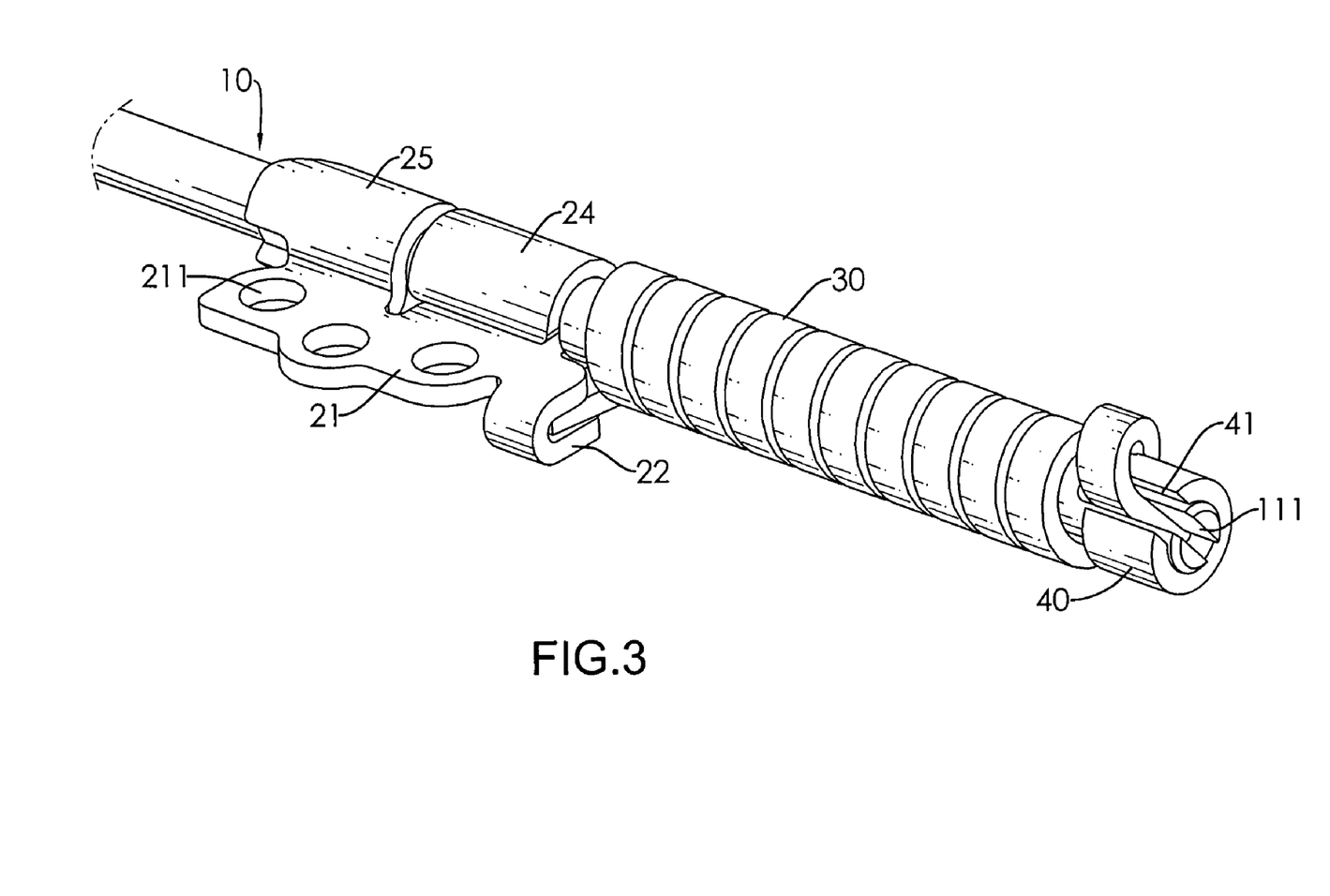
FIG. 3 is an enlarged perspective view of the hinge in FIG. 1.
Figure 4:
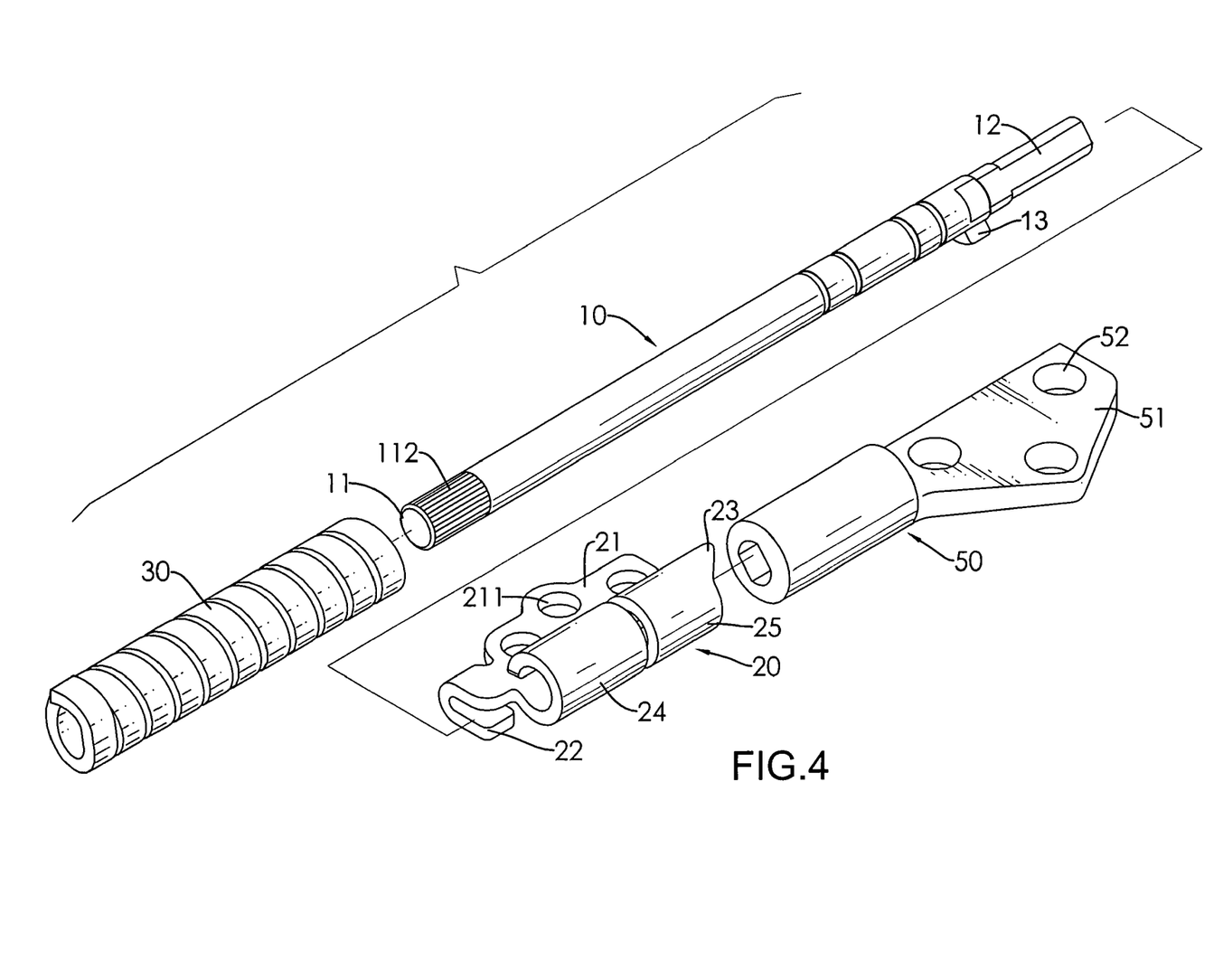
FIG. 4 is an exploded perspective view of a second embodiment of a hinge in accordance with the present invention.
Figure 5:
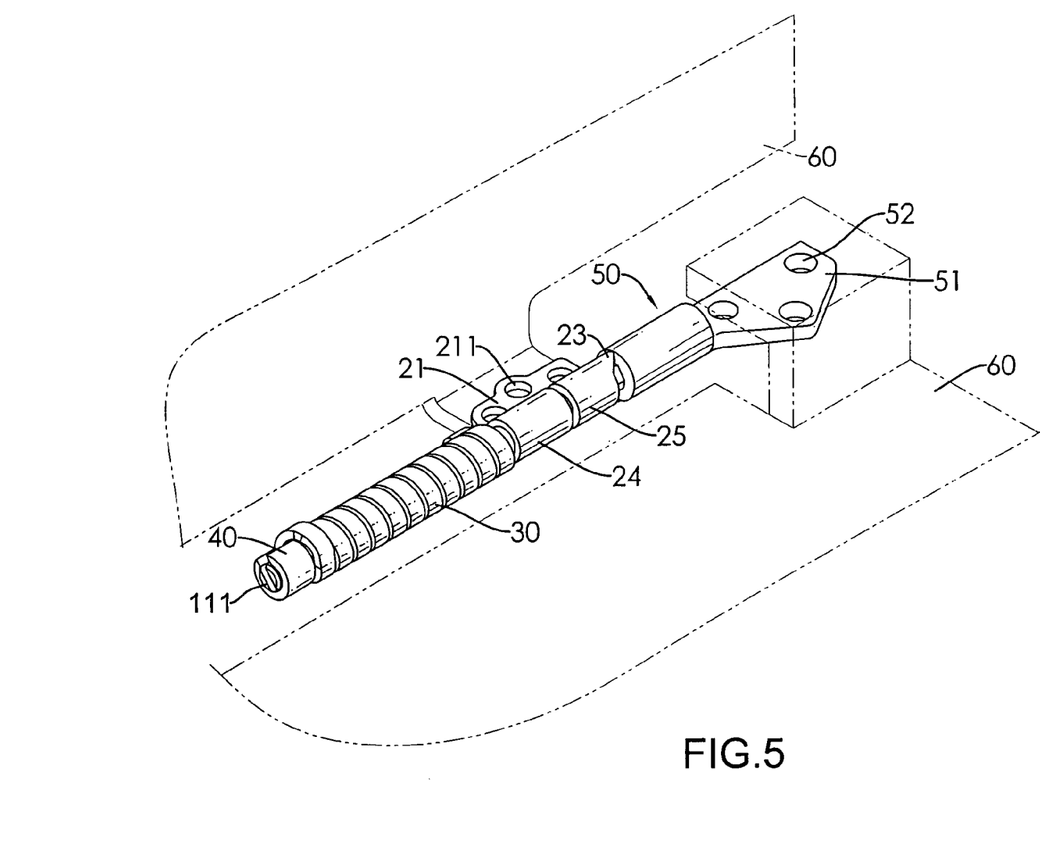
FIG. 5 is an operational perspective view of the hinge in FIG. 1, shown mounted between a cover and a base.
Figure 6:
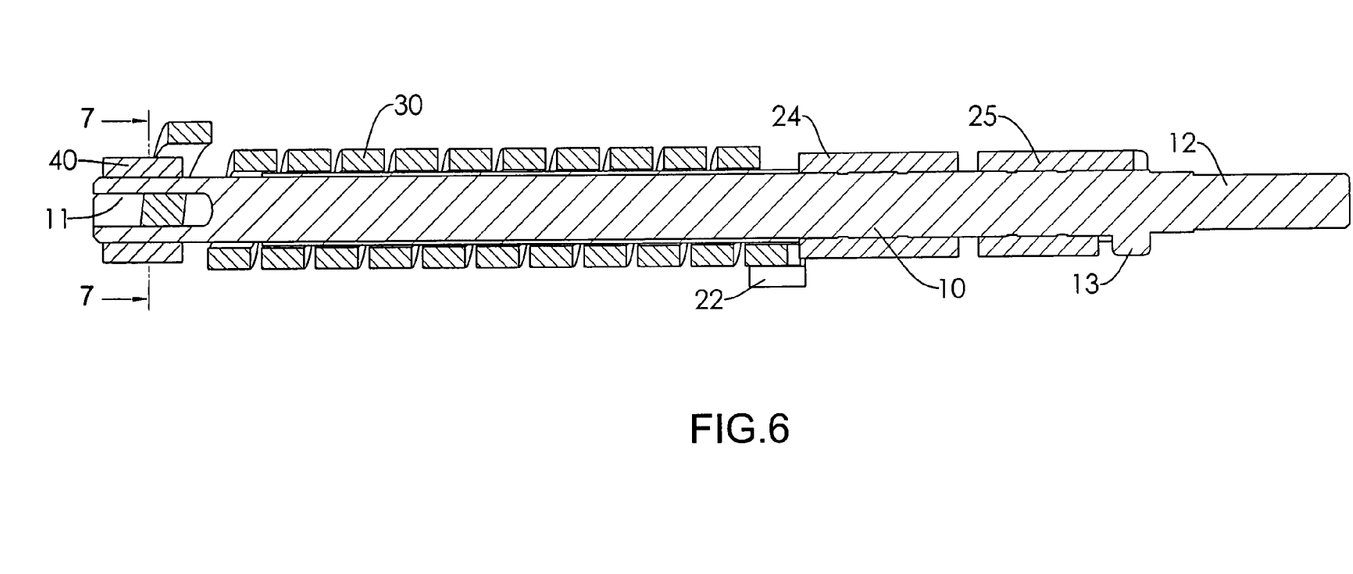
FIG. 6 is a cross sectional side view of the hinge along line 6-6 in FIG. 7.
Figure 7:
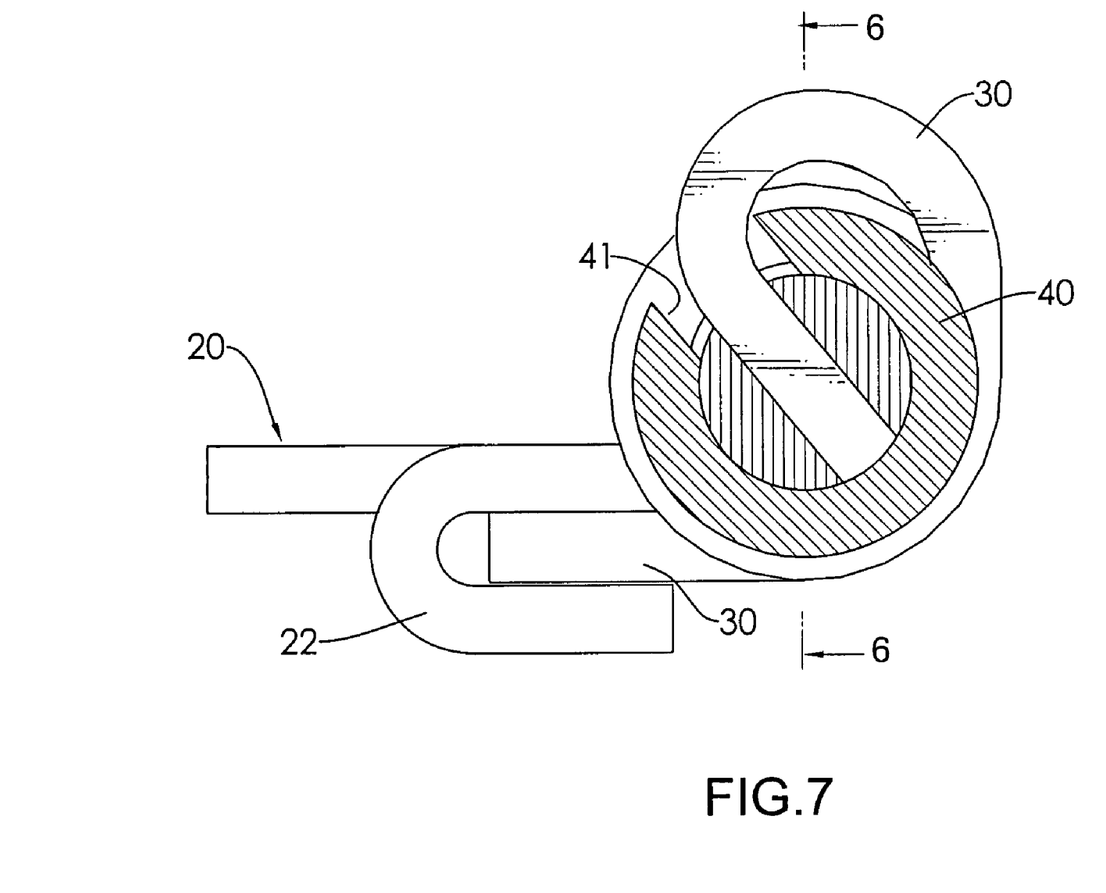
FIG. 7 is an enlarged end view of the hinge along line 7-7 in FIG. 6, a pintle and C-clip shown shaded for clarity.
Figure 8:
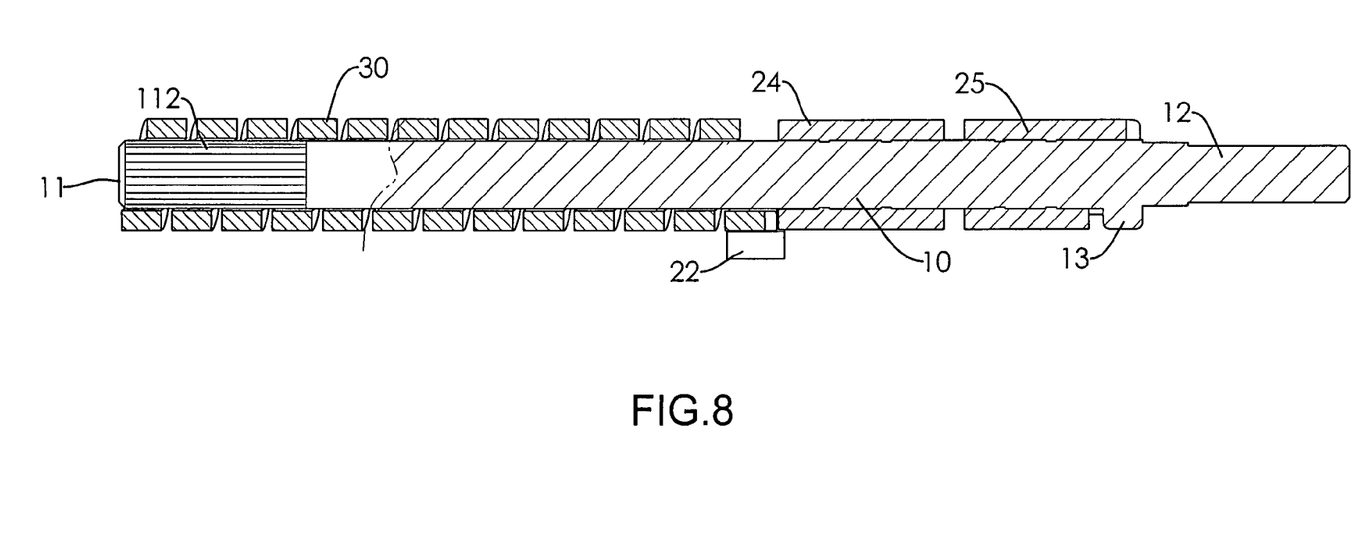
FIG. 8 is a cross sectional side view of the hinge in FIG. 4.

With further reference to FIGS. 3 and 4, the pintle (10) has a distal end (11), a proximal end (12), and a stop (13). The distal end (11) has a resilient device mount that may be a slot (111), multiple ribs (112) or the like. The slot (111) is formed axially in the distal end (11) of the pintle (10) as shown in FIG. 2.

The moving leaf (20) is mounted around the pintle (10) and has a mounting segment (21), a clamp (22), a barrel (24) and a protruding limit (23). The mounting segment (21) has an inner end and at least one fastening hole (211) formed through the mounting segment (21). The clamp (22) is formed on and protrudes from the inner end of the moving leaf (20). The barrel (24) is formed longitudinally on the mounting segment (21), is mounted around the pintle (10) and has an outer end and may be split into two barrels (24, 25). The protruding limit (23) is formed on and protrudes from the outer end of the barrel (24) and selectively abuts the stop (12) of the pintle (10) to limit rotation of the moving leaf (20).

The resilient device (30) is mounted around the pintle (10) and has two ends. The ends of the resilient device (30) respectively correspond to and are attached securely to the resilient device mount of the pintle (10) and the clamp (22) of the moving leaf (20). The corresponding end of the resilient device (30) may be mounted securely in the slot (111) of the pintle (10) or may be clamped on the ribs (112) of the pintle (10).

The C-clip (40) is mounted around the distal end (11) of the pintle (10), has an opening (41), holds an end of the resilient device (30) in the resilient device mount and reinforces the distal end (11) of the pintle (10) to prevent breakage.

The stationary leaf (50) is attached securely to the pintle (10) and has a mounting segment (51), a pintle hole and an inner surface. The mounting segment has at least one fastening hole (52) formed therethrough. The pintle hole is formed in the mounting segment, corresponds to and is mounted securely on the proximal end (12) of the pintle (10). The inner surface is formed adjacent to the pintle hole and abuts the protruding limit (23) and ensures a gap is maintained between the barrel (24) and the stationary leaf (50) for wiring, cables or the like.

With further reference to FIGS. 5 to 8, fasteners are respectively mounted through each fastening hole (211, 52) of the moving leaf (20) and the stationary leaf (50) to attach the hinge to a cover and a base of an electronic device such as a notebook (60). When the moving leaf (20) is rotated relative to the stationary leaf (50) and the pintle (10), the protruding limit (23) ensures the gap is formed between itself and the stationary leaf (50) so protects electric wires and cables connecting the cover to the base of the notebook (60). When the cover is released the resilient device (30) can supply a stored force to open the notebook (60). When the cover of the notebook (60) is closed, the resilient device mount can disperse the torsion force of the resilient device (30) to bear the stored force and prevent breakage and the C-clip (40) is mounted around the distal end to protect of the pintle (10) further. In the other embodiment, the resilient device mount having multiple ribs (112) may allow the resilient device (30) to slip before the stored force causes terminal damage. Then, once opened, re-closing the cover causes the resilient device (30) to realign for future use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge for notebooks, comprising:
   a pintle having a distal end having a slot being formed axially in the distal end of the pintle; and a proximal end;
   a moving leaf having a mounting segment being mounted around the pintle and having an inner end and at least one fastening hole formed through the mounting segment; a clamp being formed on and protruding from the inner end of the moving leaf; and a barrel being formed longitudinally on the mounting segment, being mounted around the pintle and having an outer end;
   a resilient device being mounted around the pintle and having two ends, one of the ends corresponding to and being attached securely on the clamp of the moving leaf and the other one of the ends mounted securely in the slot of the pintle;
   a stationary leaf being attached securely to the pintle and having a mounting segment having at least one fastening hole formed through the mounting segment; a pintle hole being formed in the mounting segment, corresponding to and being mounted securely on the proximal end of the pintle; and an inner surface being formed adjacent to the pintle hole; and
   a C-clip having an opening and being mounted on the distal end of the pintle and holding the end of the resilient device that is mounted in the slot, wherein said C-clip defines a longitudinal thickness that is greater than the length of a perimeter opening located alone a perimeter of the C-clip, and wherein the end of the resilient device that is mounted in the slot extends into said C-clip through the opening along the perimeter of the C-clip.

2. The hinge as claimed in claim 1, wherein
   the pintle has a stop being formed adjacent to the proximal end of the pintle; and
   the moving leaf further has a protruding limit being formed on and protruding from the outer end of the barrel and selectively abutting the stop of the pintle.

3. The hinge as claimed in claim 2, wherein the barrel of the moving leaf is split into two barrels.

4. The hinge of claim 1, wherein the distal end of said pintle has a diameter that is smaller than the diameter of the central portion of said pintle.

5. The hinge of claim 1, wherein said C-clip structurally reinforces the distal end of said pintle to prevent breakage of the pintle.

6. The hinge of claim 1, wherein said resilient device comprises a torsion spring having a rectangular cross-section.

7. The hinge of claim 1, wherein the clamp of said moving leaf is arranged to accept the end of said resilient device without the end of said resilient device requiring any distortion thereof.

8. A notebook computer, comprising:
   a hinge rotatably coupling a base of the notebook computer to a cover of the notebook computer, wherein said hinge includes
   a pintle having a distal end with a slot formed therein and a proximate end located opposite the distal end,
   a moving leaf having a mounting segment coupled to one of said base or cover, a longitudinally formed barrel mounted around said pintle, and a clamp formed therein,
   a resilient device arranged around the pintle and having a first end located in the clamp of the moving leaf and a second end located in the slot of the pintle,
   a stationary leaf having a mounting segment coupled to one of said base or cover and a hole receiving said pintle therein, and
   a C-clip mounted on the distal end of said pintle and holding the second end of the resilient device therein, wherein said C-clip defines a longitudinal thickness that is greater than the length of a perimeter opening located along a perimeter of the C-clip.

9. The notebook computer of claim 8, wherein said C-clip further defines a central longitudinal opening that mounts over said pintle.

10. The notebook computer of claim 9, wherein the second end of the resilient device extends into the central longitudinal opening of the C-clip through the perimeter opening of the C-clip.

11. The notebook computer of claim 8, wherein the distal end of said pintle has a diameter that is smaller than the diameter of the central portion of said pintle.

12. The notebook computer of claim 8, wherein said C-clip structurally reinforces the distal end of said pintle to prevent breakage of the pintle.

13. The notebook computer of claim 8, wherein said resilient device comprises a torsion spring having a rectangular cross-section.

14. The notebook computer of claim 8, wherein said clamp is arranged to accept the first end of said resilient device without the first end requiring any distortion thereof.

15. A notebook hinge, comprising
   a pintle having a proximal end and distal end with a slot formed axially therein;
   a first leaf coupled to the pintle and being adapted to couple to a first notebook component, the first leaf having a clamp formed thereon;
   a resilient device mounted around the pintle and having a first end disposed within the clamp of the first leaf and a second end disposed within the slot of the pintle;

a second leaf coupled to the pintle and being adapted to couple to a second notebook component; and a C-clip defining central longitudinal opening, a side opening located along a perimeter thereof, and a longitudinal thickness that is greater than the length of the side opening along the perimeter of the C-clip, wherein the C-clip is mounted on the distal end of the pintle, and wherein the second end of the resilient device extends through the side perimeter opening and ends within the central longitudinal opening of the C-clip.

16. The notebook hinge of claim 15, wherein the distal end of said pintle has a diameter that is smaller than the diameter of the central portion of said pintle, and wherein said C-clip structurally reinforces the distal end of said pintle to prevent breakage of the pintle.

17. The notebook hinge of claim 15, wherein said clamp is arranged to accept the first end of said resilient device without the first end requiring any distortion thereof.

18. The hinge of claim 1, wherein the clamp of said moving leaf wraps around the distal edge of the end of said resilient device received thereby.

19. The notebook computer of claim 8, wherein the clamp of said moving leaf wraps around the distal edge of the first end of said resilient device received thereby.

20. The notebook hinge of claim 15, wherein the clamp of said moving leaf wraps around the distal edge of the first end of said resilient device received thereby.

* * * * *

UNITED STATES PATENT AND TRADEMARK OFFICE
CERTIFICATE OF CORRECTION

| | | |
|---|---|---|
| PATENT NO. | : 8,091,178 B2 | Page 1 of 1 |
| APPLICATION NO. | : 12/081521 | |
| DATED | : January 10, 2012 | |
| INVENTOR(S) | : Brett William Degner et al. | |

It is certified that error appears in the above-identified patent and that said Letters Patent is hereby corrected as shown below:

In the Claims

Column 3, line 60 "greater than the" should read --greater than a--.

Column 3, line 61 "located alone" should read --located along--.

Column 4, line 7 "the diameter of the central" should read --a diameter of a central--.

Column 4, line 37 "than the length" should read --than a length--.

Column 5, line 5 "than the length" should read --than a length--.

Column 5, line 12/13 "the diameter of the central" should read --a diameter of a central--.

Signed and Sealed this
Second Day of September, 2014

Michelle K. Lee
*Deputy Director of the United States Patent and Trademark Office*